(12) United States Patent
Peng et al.

(10) Patent No.: US 8,929,698 B2
(45) Date of Patent: Jan. 6, 2015

(54) PLASMONIC TRANSDUCER WITH REDUCED CROSS SECTION AT MEDIA-READING SURFACE

(71) Applicant: Seagate Technology LLC, Cupertino, CA (US)

(72) Inventors: Chubing Peng, Minnetonka, MN (US); Kaizhong Gao, Shoreview, MN (US); Yongjun Zhao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 54 days.

(21) Appl. No.: 13/675,776

(22) Filed: Nov. 13, 2012

(65) Prior Publication Data

US 2013/0071062 A1    Mar. 21, 2013

Related U.S. Application Data

(63) Continuation-in-part of application No. 13/231,569, filed on Sep. 13, 2011.

(51) Int. Cl.

| | |
|---|---|
| *G02B 6/26* | (2006.01) |
| *G02B 6/42* | (2006.01) |
| *B29D 11/00* | (2006.01) |
| *B05D 5/06* | (2006.01) |
| *G11B 5/31* | (2006.01) |
| *G11B 5/60* | (2006.01) |
| *G02B 6/122* | (2006.01) |
| *G11B 5/00* | (2006.01) |

(52) U.S. Cl.
CPC .............. *G11B 5/314* (2013.01); *G11B 5/6088* (2013.01); *G02B 6/1226* (2013.01); *G11B 2005/0021* (2013.01)
USPC ................................ 385/31; 216/24; 427/162

(58) Field of Classification Search
CPC .... G02B 6/262; G02B 6/2817; G02B 6/4206; G02B 6/4214; G02B 6/4298
USPC ................................ 385/31; 216/24; 427/162
See application file for complete search history.

(56) References Cited

U.S. PATENT DOCUMENTS

| | | | |
|---|---|---|---|
| 5,512,364 A * | 4/1996 | Chiba et al. .................... | 428/332 |
| 7,330,404 B2 | 2/2008 | Peng et al. | |
| 7,706,654 B2 * | 4/2010 | Peng et al. ..................... | 385/131 |
| 2002/0031291 A1 * | 3/2002 | Montgomery et al. ........... | 385/7 |
| 2010/0097901 A1 | 4/2010 | Challener et al. | |
| 2010/0123965 A1 | 5/2010 | Lee et al. | |
| 2010/0328807 A1 | 12/2010 | Snyder et al. | |
| 2011/0002199 A1 | 1/2011 | Takayama et al. | |

OTHER PUBLICATIONS

U.S. Appl. No. 13/231,549, filed Sep. 13, 2011, Peng et al.
U.S. Appl. No. 13/231,569, filed Sep. 13, 2011, Peng et al.
Jun. 26, 2013, File History for U.S. Appl. No. 13/231,549, 135 pages.

* cited by examiner

*Primary Examiner* — Jerry Blevins
(74) *Attorney, Agent, or Firm* — Hollingsworth Davis, LLC

(57) ABSTRACT

A plasmonic transducer includes at least two metal elements with a gap therebetween. The metal elements are placed along a plasmon-enhanced, near-field radiation delivery axis. Cross sections of the metal elements in a plane normal to the delivery axis vary in shape along the delivery axis. The metal elements have a reduced cross section portion at a media-facing surface oriented normal to the delivery axis. A dielectric material surrounds the reduced cross section portion of the plasmonic transducer at the media-facing surface, and reduces deformation of the metal elements proximate the media-facing surface at elevated temperatures.

20 Claims, 11 Drawing Sheets

PLASMONIC TRANSDUCER WITH REDUCED CROSS SECTION AT MEDIA-READING SURFACE

CROSS REFERENCE TO RELATED CASES

This is a continuation-in-part of U.S. patent application Ser. No. 13/231,569, filed Sep. 13, 2011, U.S. Publication No. 2013/0064502, which is hereby incorporated by reference in its entirety.

SUMMARY

Various embodiments described herein are generally directed to a near-field transducer that may be used, e.g., for heat assisted magnetic recording. In one embodiment, a plasmonic transducer includes at least two metal elements with a gap therebetween. The metal elements are placed along a plasmon-enhanced, near-field radiation delivery axis. The metal elements have a reduced cross section portion at a media-facing surface oriented normal to the delivery axis. A dielectric material surrounds the reduced cross section portion of the plasmonic transducer at the media-facing surface, and reduces deformation of the metal elements proximate the media-facing surface at elevated temperatures.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
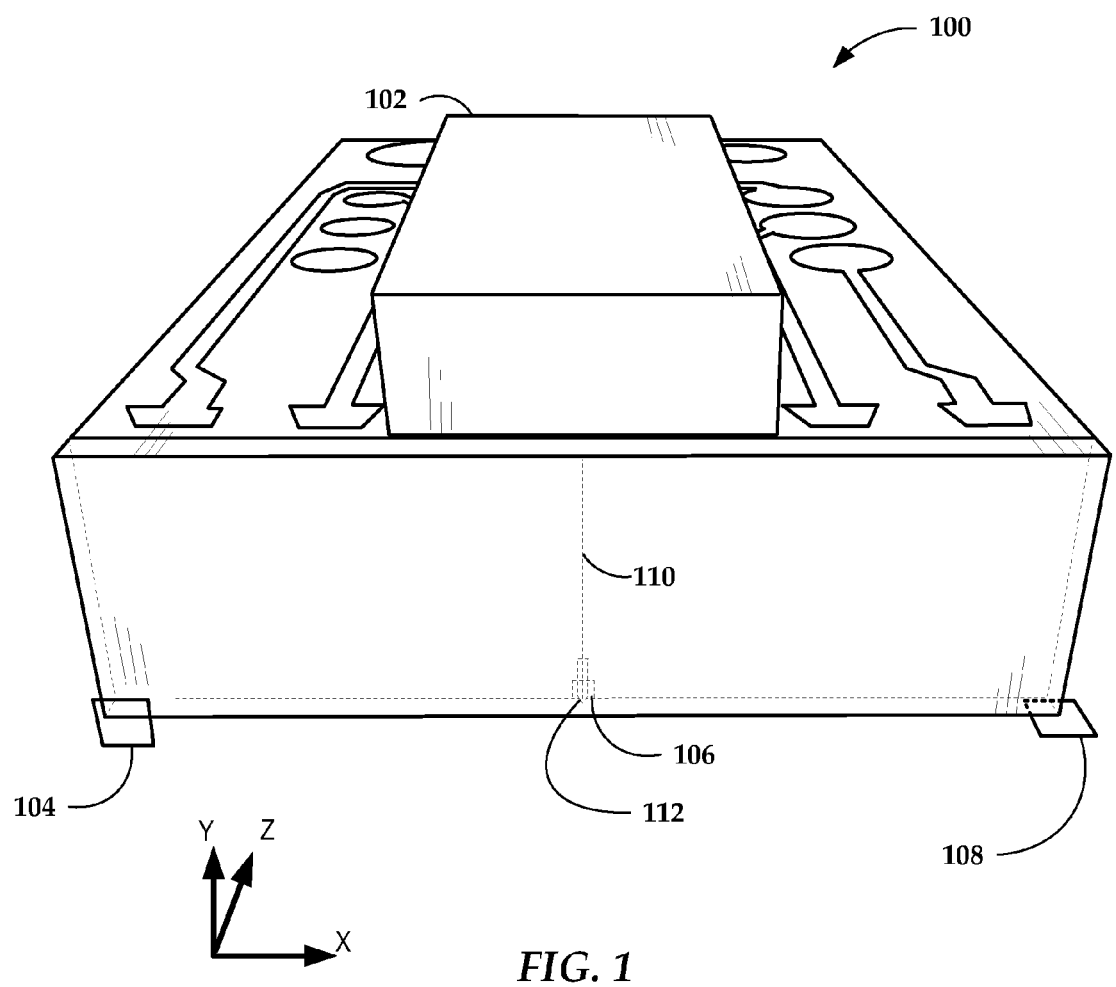
FIG. 1 is a perspective view of a thermal assisted recording slider utilizing a near-field transducer and waveguide according to an example embodiment.

The present disclosure relates to a gap-plasmon, near-field transducer (NFT) that is generally coupled to a slot waveguide. The NFT may be formed of a metallic film and include recording reduced cross-section at a media reading surface. This reduced cross-section may, among other things, reduce protrusion of the NFT out of the media reading surface, due to the surrounding materials helping the NFT to hold its shape under high temperatures and under other conditions, such as during manufacture.

It will be appreciated that the NFT and waveguide described herein may be usable in any situation where a beam of highly focused and relatively powerful electromagnetic energy is desired. One such application is in heat assisted magnetic recording (HAMR), also referred to as thermally assisted magnetic recording (TAMR). In reference to FIG. 1, a perspective view shows an example HAMR slider 100. This example slider 100 includes a laser diode 102 located on top of the slider 100 proximate to a trailing edge surface 104 of the slider 100. The laser diode 102 delivers light proximate to a HAMR read/write head 106, which has one edge on an air bearing surface 108 of the slider 100. The air bearing surface 108 faces and is held proximate to a moving media surface (not shown) during device operation.

The laser diode 102 provides electromagnetic energy to heat the media at a point near to the read/write head 106. Optical coupling components, such as a waveguide 110, are formed integrally within the slider device 100 to deliver light from the laser 102 to the media. In particular, a local waveguide 110 and NFT 112 may be located proximate the read/write head 106 to provide local heating of the media during write operations. The laser diode 102 in this example may be an integral, edge firing device, although it will be appreciated that the waveguide 110 and NFT 112 may be used with any light source and light delivery mechanisms. For example, surface emitting lasers (SEL) may be used instead of edge firing lasers.

While the example in FIG. 1 shows a laser 102 integrated with the slider 100, the NFT 112 discussed herein may be applicable to any type of light delivery configuration. For example, a free-space light delivery configuration, a laser may be mounted externally to the slider, and coupled to the slider by way of optic fibers and/or waveguides. The slider in such an arrangement may include a grating coupler into which light is coupled and delivered to a slider-integrated waveguide 110 which energizes the NFT 112.

A HAMR device utilizes the types of optical devices described above to heat a magnetic recording media (e.g., hard disk) in order to overcome superparamagnetic effects that limit the areal data density of typical magnetic media. When writing to a HAMR medium, the light is concentrated into a small hotspot over the track where writing takes place. The light propagates through a waveguide 110 where it is coupled to the NFT 112, e.g., either directly from the waveguide or by way of a focusing element. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may transfer light between components via rectangular dielectric slab or channel waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 800-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create the hotspots on the media.

The NFT 112 is a near-field optics device designed to reach local surface plasmon conditions at a designed wavelength. A waveguide and/or other optical element concentrates light on a transducer region (e.g., focal region) near which the NFT 112 is located. The NFT 112 is designed to achieve surface plasmon resonance in response to this concentration of light. At resonance, a high electric field surrounds the NFT 112 due to the collective oscillations of electrons at the metal surface. Part of this field will tunnel into a storage medium and get absorbed, thereby raising the temperature of a spot on the media as it being recorded.

Figure 2A:
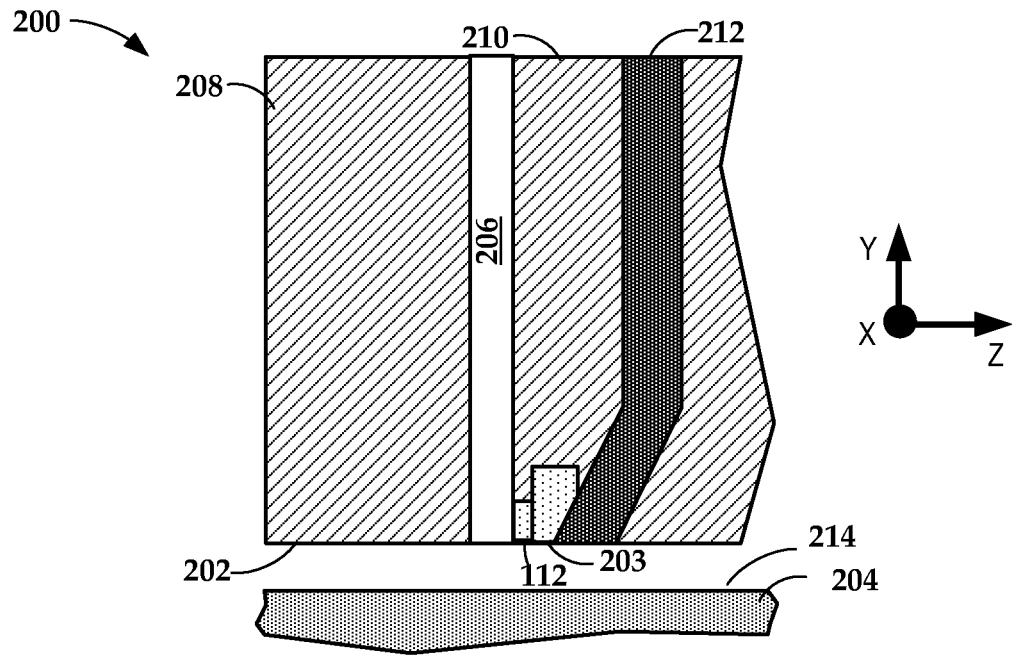
FIGS. 2A and 2B are cutaway and perspective views of a near-field transducer and waveguide core according to an example embodiment.

In reference now to FIG. 2A, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2A, the media-facing surface 202 is arranged parallel to the x-z plane. A waveguide core 206 may be disposed proximate the NFT 122 which is located at or near the media writing surface 214. The waveguide core 206 is surrounded by cladding layers 208, 210 that have different indices of refraction than the core 206. Light is delivered from the waveguide core 206 along the negative y-direction where it is coupled to the NFT 112. The NFT 112 delivers surface plasmon enhanced, near-field electromagnetic energy along the negative y-axis where it exits at the media writing surface 214. This may result in a highly localized hot spot (not shown) on the media surface 214 when the media 204 placed in close proximity to surface 202 of the apparatus 200. Further illustrated in FIG. 2A is a recording pole 212 of the read/write head that is located alongside the NFT 112. The recording pole 212 generates a magnetic field used in changing the magnetic orientation of the hotspot during writing.

Figure 2B:
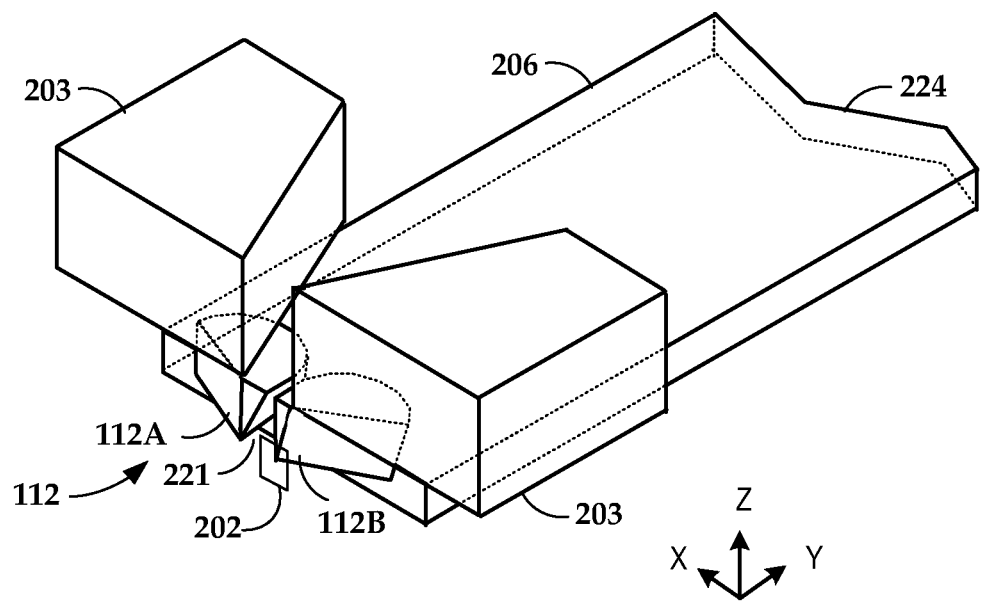

In reference now to FIG. 2B, a perspective view shows additional details of the waveguide core 206 and NFT 112 shown in FIG. 2A. This view shows relative orientations between the gap-plasmon NFT 112, heat sinks 203, and associated dielectric, channel waveguide core 206. The plasmon NFT includes first and second metal elements 112A, 112B that may be formed of a plasmonic metal such as gold (Au). The metal elements 112A, 112B are arranged side-by-side with a gap 221 disposed therebetween. In this arrangement, the gap 221 and elements 112A, 112B can be considered to form a waveguide, herein referred to as a "slot waveguide," which is a non-limiting term meant differentiate from the channel waveguide formed by core 206 and surrounding cladding layers. A lower surface of the metal elements 112A, 112B (e.g., surface proximate the waveguide core 206) may reside on a common plane that is parallel to a substrate plane, e.g., a plane on which the various components are built using wafer fabrication techniques.

The three-dimensional channel waveguide includes a core 206 that may be formed from a dielectric material such as TiOx, $Ta_2O_5$, ZnS, SiNx, etc. It will be appreciated that, components 112, 203, and 206 may be surrounded or substantially surrounded by other materials, e.g., dielectric materials such as alumina (see materials 208, 210 in FIG. 1A), that are manufactured with components 112, 203, and 206 using wafer fabrication techniques.

Any exposed surface of the metal elements 112A, 112B shown in FIG. 2B may be surrounded by dielectric material, except for the small portion (e.g., the output ends) exposed on the media facing surface 202. The metal elements 112A, 112B may be formed directly on or in the waveguide core 206, or a layer of dielectric (e.g., cladding) may separate the elements 112A, 112B from the core 206. The waveguide may extend any distance in the y-direction, as indicated by the broken edge 224 on core 224. As seen in FIG. 2A, the core 206 may be disposed along the entire length of NFT 112 so that an end of the core 206 is near the media-facing surface 202. In other embodiments, the core 206 may be terminated away from the NFT 112 and/or media-facing surface 202, e.g., as shown in FIG. 2B.

Figure 3A:
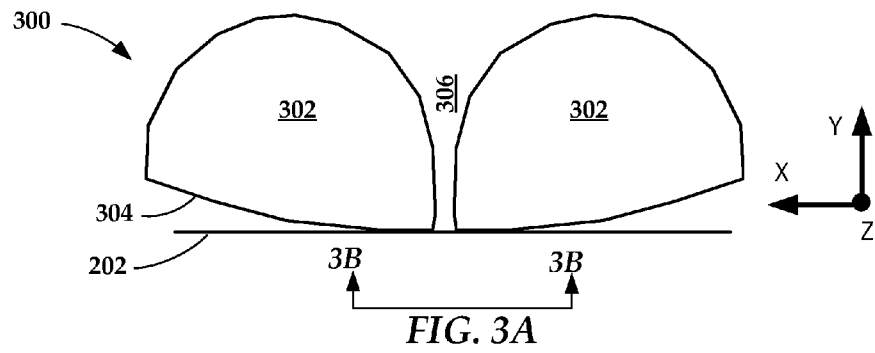
FIGS. 3A and 3B are top and front views of metal elements according to an example embodiment.
Figure 3B:
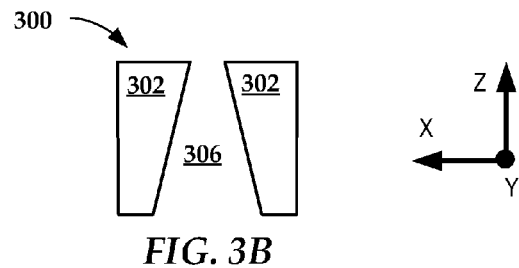
Figure 3C:
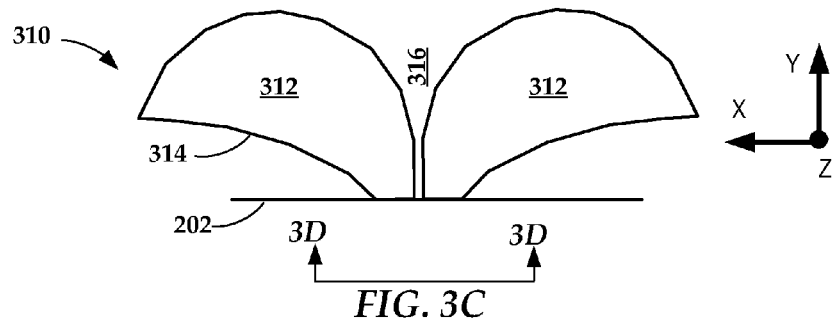
FIGS. 3C and 3D are top and front view of metal elements according to another example embodiment.
Figure 3D:
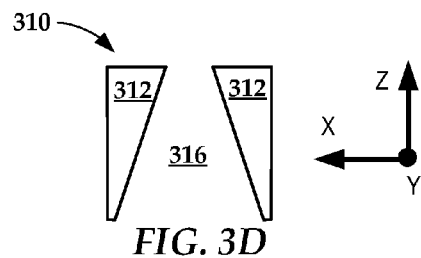

In reference now to FIGS. 3A and 3C, top views (xy-plane) illustrate example embodiments of an NFT 300 and NFT 312. Similarly FIGS. 3B and 3D illustrate respective front (xz-plane) views of the NFTs 300, 310. As seen in the top views of FIGS. 3A and 3C, the metal elements 302, 312 are tapered near the media facing surface 202 so that only a small portion of the elements 302, 312 are exposed at the surface 202. Edges 304, 314 facing away from gaps 306, 316 are convex and concave, respectively, for the elements 300, 310. Corresponding edges on elements 112A, 112B in FIG. 2 are straight. The shape of edges 304, 314, as well as other dimensions of the elements 302, 312 may be varied depending on the selected design parameters. Those parameters may include the type of wavelength that delivers light to the NFT, type of coupling between the waveguide and NFT, laser parameters (power, wavelength, etc.), desired hotspot size, heat transfer considerations, etc. As a result, it is contemplated that the final geometry in a production device may vary considerably from the examples illustrated.

In FIGS. 3B and 3D media-facing surface views are shown that correspond to sections 3B-3B and 3D-3D of FIGS. 3A and 3C, respectively. As these media-facing views indicated, the elements 302, 312 are tapered in a downtrack direction (z-direction) and have trapezoidal or triangular shapes in this cross-section. The tapers in this cross section are used for tuning the behavior of the NFT, e.g., producing a plasmon beam of a particular shape and size, and with a desired coupling efficiency. It will be appreciated that one or more of the edges of the metal elements 202, 212 may use an alternate curve/shape, e.g., rounded, parabolic, exponential, etc. It will also be appreciated that cross-sections along the delivery axis (z-axis) of the metal elements 302, 312 may be congruent with each other, or be varied at different z-locations.

In FIGS. 4A-4B and 5A-5B, graphs 400, 410, 500, 510 show geometry and coupling efficiency analysis results according to an example embodiment. Graphs 400 and 410 represent different xy-plane geometries that were analyzed. Both configurations in graphs 400 and 410 have the same approximate overall size along the x-and y-axes, however the configuration in graph 400 has an 100 nm offset 402 from the media facing surface along the outer edge of the elements, where an analogous offset 412 in graph 410 is 50 nm. The cross sectional shape at the media reading surface is seen in graph 500 of FIG. 5A, and is substantially the same for both configurations.

Figure 4A:
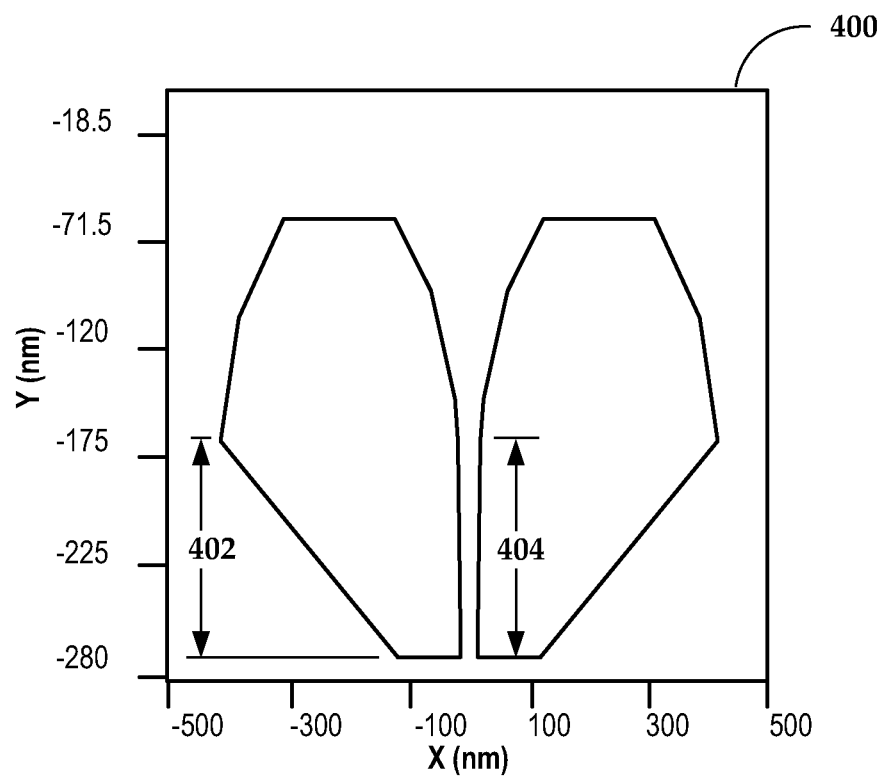
FIGS. 4A, 4B, and 5A are graphs illustrating geometry and dimensions of a near-field transducer used in analyzing the design according to example embodiments.
Figure 4B:
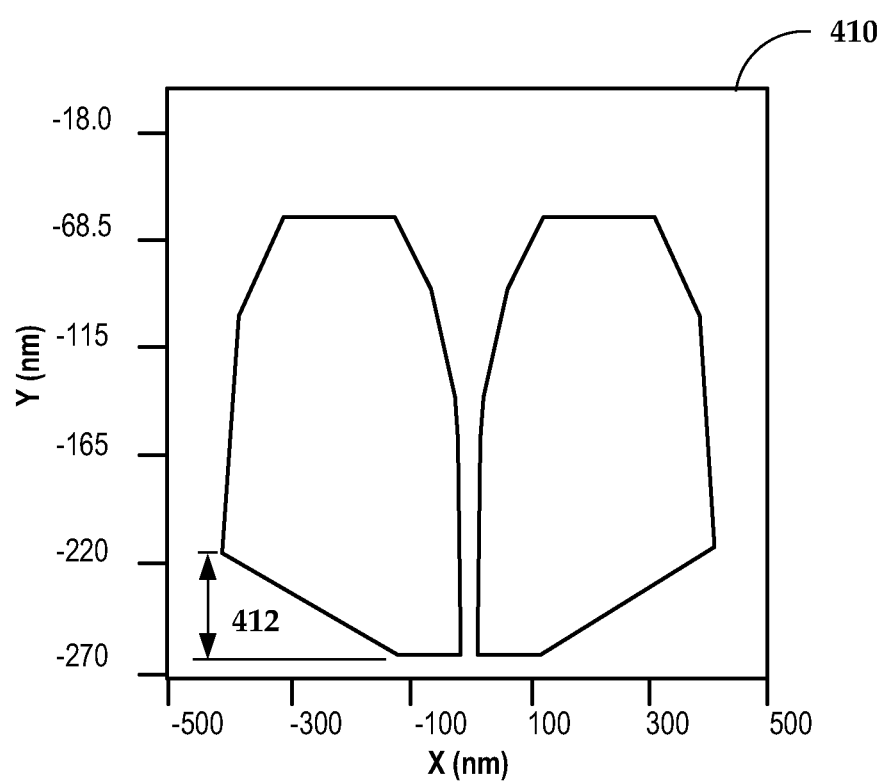
Figure 5A:
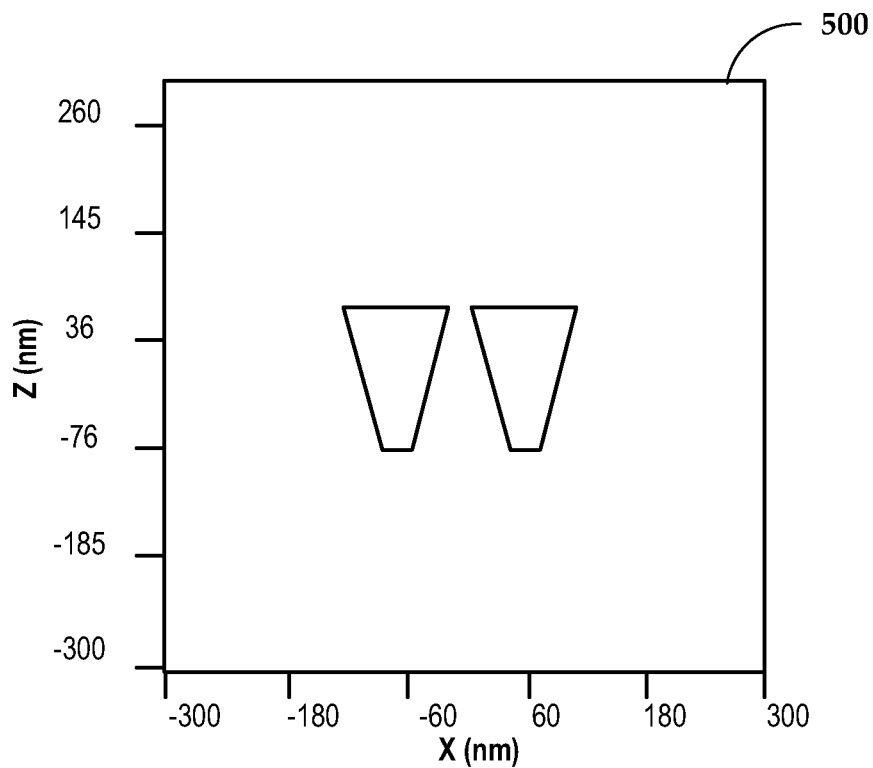
Figure 5B:
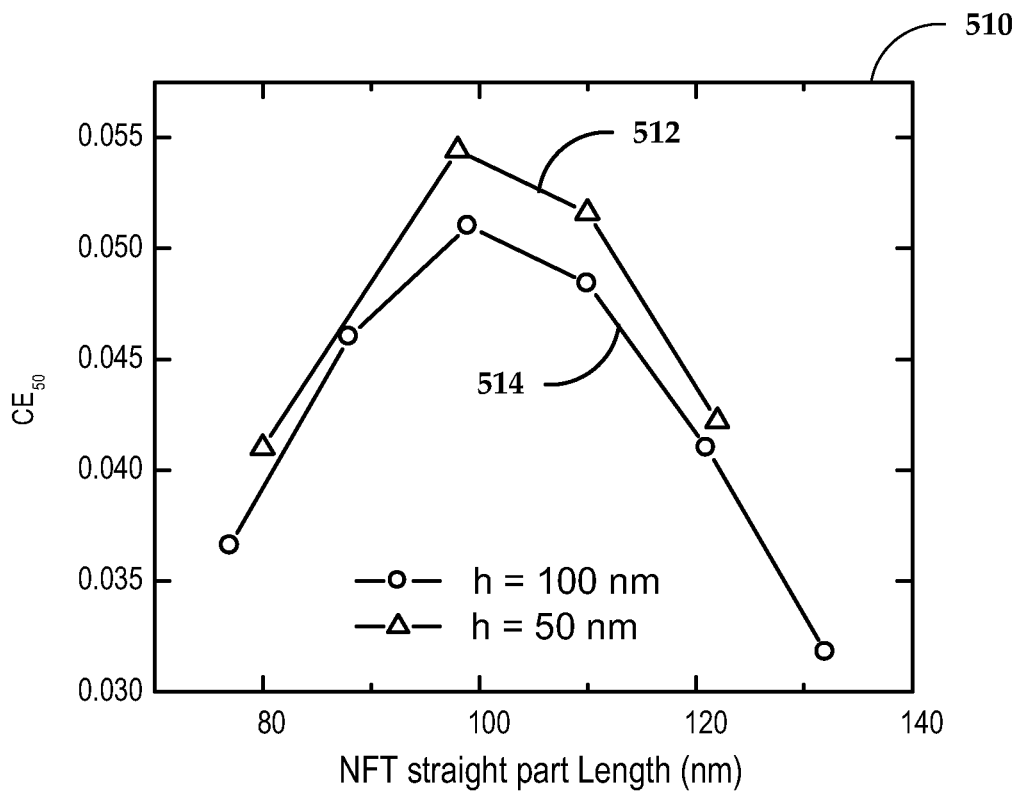
FIG. 5B is a graph illustrating coupling efficiency results for geometries of FIGS. 4A, 4B, and 5A.

An analysis of the two geometries of graphs 400, 410 was performed to compare optical power absorbed in a recording layer as a function of the metal element tip length (e.g., length 404 in FIG. 4A). In both examples, the dielectric materials that surround the metal elements were selected to have a coefficient of thermal expansion lower than that of the metal elements. To evaluate the efficiency of the NFT, a storage medium was modeled as being placed proximate the media writing surface. As seen in FIG. 5B, coupling efficiency data was modeled for metal element tip lengths that varied from ~80 nm to ~130 nm. Curve 512 in graph 510 corresponds to results for geometry of FIG. 4B, and curve 514 corresponds to results for geometry of FIG. 4A.

The coupling efficiency (CE) in FIG. 5B shows a penalty of approximately 5% for increasing the edge taper from 50 nm (dimension 412 in FIG. 4B) to 100 nm (dimension 402 in FIG. 4A). Coupling efficiency and resolution could be further improved by optimizing the shape of the NFT and the amount of dielectric materials on each side of the metal elements. Optimizing the apparatus based on these concepts will help maintain the shape and quality of the NFT, by reducing deformation, protrusion and burnishing of the metal elements. Additionally, a thermally conductive heat sink (e.g., heat sink 203 in FIG. 2B) could be added to this design to further reduce the temperature rise of the metal elements. The heat sink can be made of gold, aluminum, copper, silver, alloys thereof, or other thermally conductive material.

As previously described, the NFT and associated components are formed using layer deposition techniques and other processes associated with semiconductor wafer fabrication. In one example process, an apparatus is formed by depositing two metal elements with a gap therebetween on a substrate, the gap being filled with a dielectric material. The two metal elements are etched so that the elements each have a protruding portion one a side of each element that faces a media-facing surface of the apparatus, the protruding portions being proximate the gap. The sides of the elements facing the media reading surface are filled with a dielectric material, the dielectric material reducing deformation of the metal elements proximate the media-facing surface at elevated temperatures.

The process may further involve depositing an etch stopper over a region extending beyond the media-facing surface and not covering the metal elements, an edge of the etch stopper having the same curvature as the sides of the elements facing the media-facing surface. A top cladding layer is deposited over the metal elements and the etch stopper, and the top cladding layer is etched to have a sloped wall that intersects with the edge of the etch stopper, the intersection forming a step between the metal elements and the sloped wall. A heat sink is deposited over the step. The heat sink includes at least two heat portions contacting the metal elements at a portion of the metal elements away from the gap. More details of this process are described below, which make reference to FIGS. 6A-10.

Figure 6A:
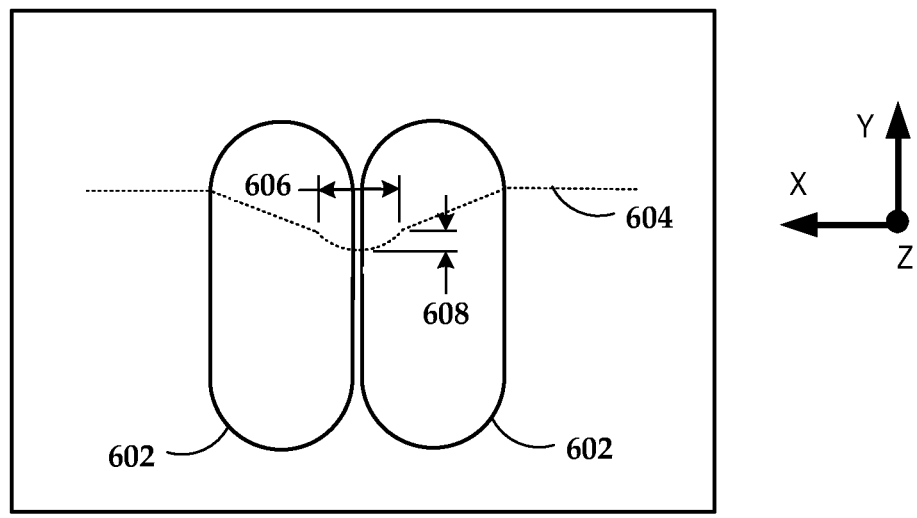
FIG. 6A is a plan view of metal elements and masking shape used to form a near-field transducer according to an example embodiment.

In reference now to FIG. 6A, a substrate plane view (xy-view) illustrates how an NFT may be formed through use of a mask according to an example embodiment. Generally, two metallic shapes 602 are deposited on a substrate (e.g., substrate 614 in FIG. 6B). The shapes may be formed from a plasmonic material such as gold, silver, copper, and alloys thereof, that is deposited to a target thickness. For example, the thickness in the configuration of FIG. 6A is 60-150 nm, although this example thickness value is not intended to be limiting. The metallic shapes 602 may be formed with the taper along the slot ridge, e.g., as seen in the cross sections of FIGS. 3B, 3D, and 5A. An example of how the tapers can be formed is described in U.S. Pat. No. 8,451,705.

Figure 6B:
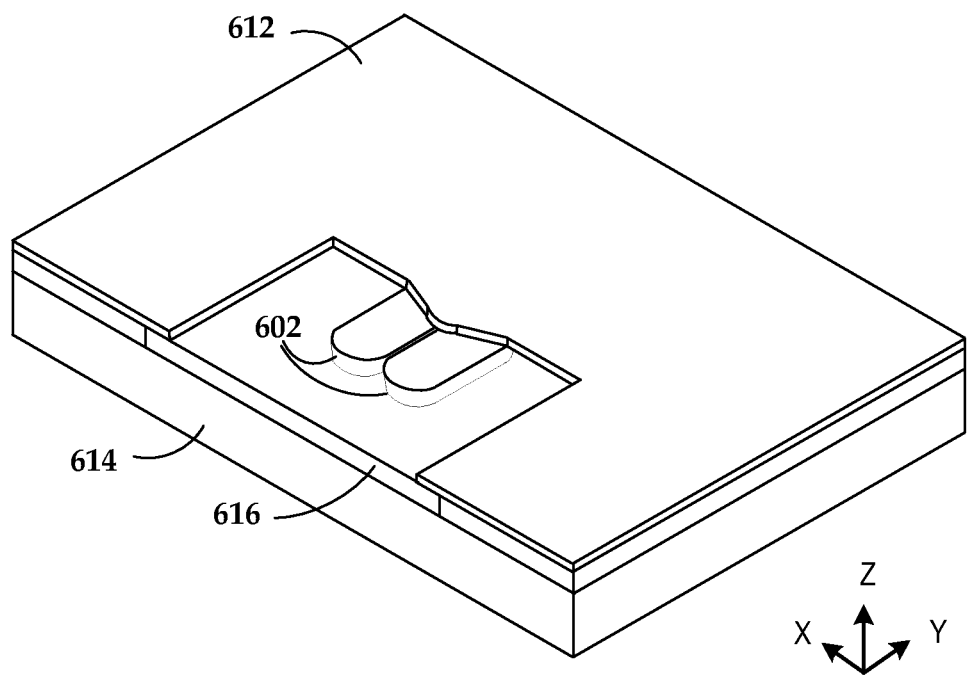
FIGS. 6B, 7A-7B, 8A-8B, 9A-9B, and 10 are perspective views illustrating manufacturing processes used to form a near-field transducer according to an example embodiment.

The dashed shape 604 represents the edge of a mask or other structure that may be used to form the desired NFT shape. In this example, dimension 606 is 198 nm, and dimension 608 is 40 nm. In FIG. 6B, a perspective view shows metallic shapes 602 deposited on a substrate 614 and surrounded by a dielectric material 616 (e.g., silica, $SiO_2$). The shapes 602 are polished via chemical-mechanical planarization (CMP). The previous hardmasks (not shown) are ashed away after CMP, and then a 30 nm to 50 nm thick amorphous carbon (aC) hardmask 612 is deposited on top of the shapes 602 and surround. The hardmask 612 patterned includes an edge conforming to the edge shape 604 in FIG. 6A.

Figure 7A:
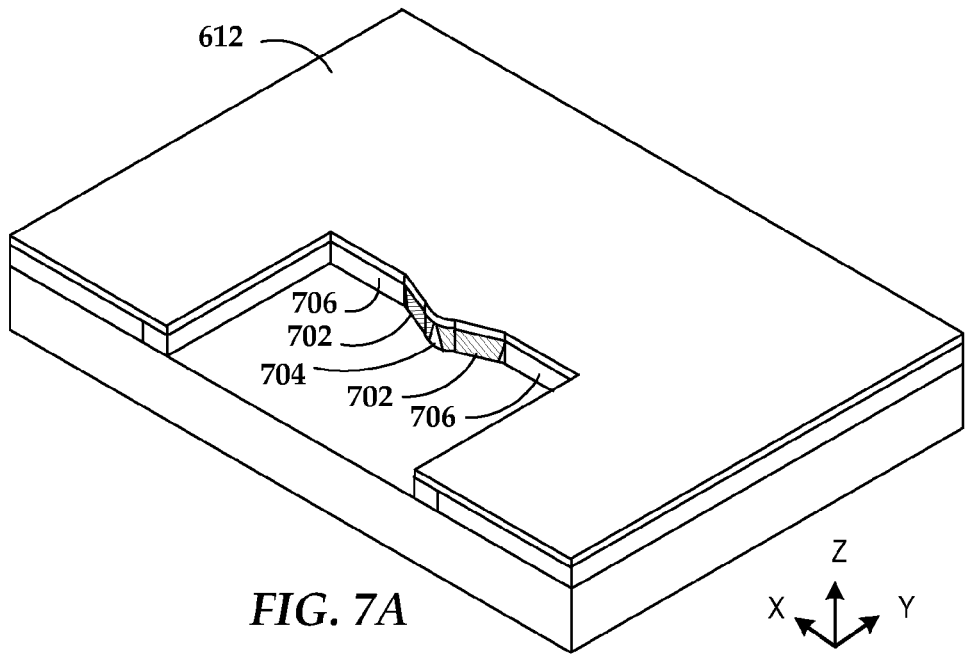
Figure 7B:
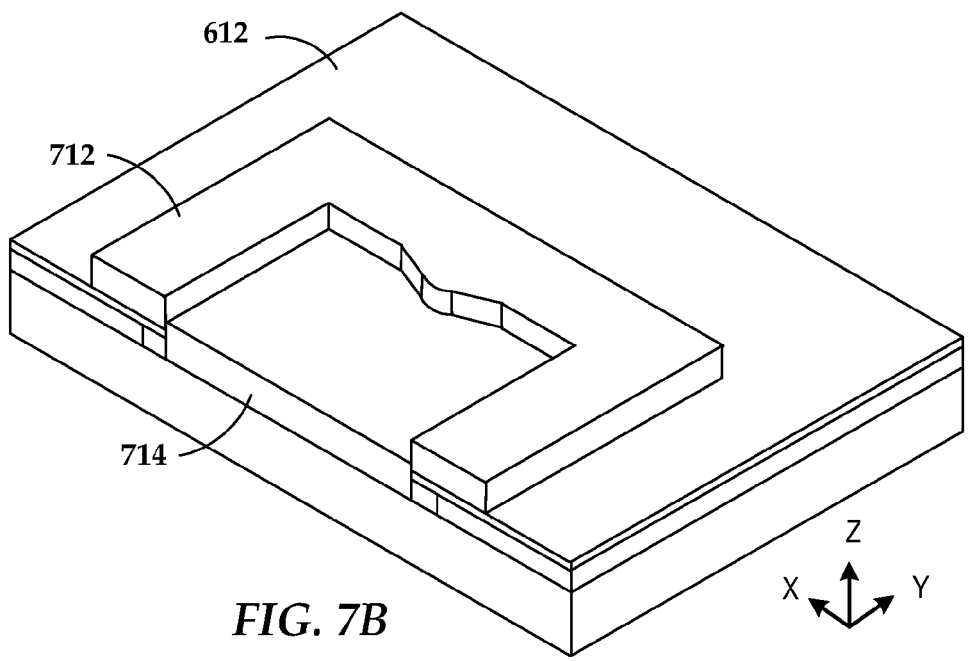
Figure 8A:
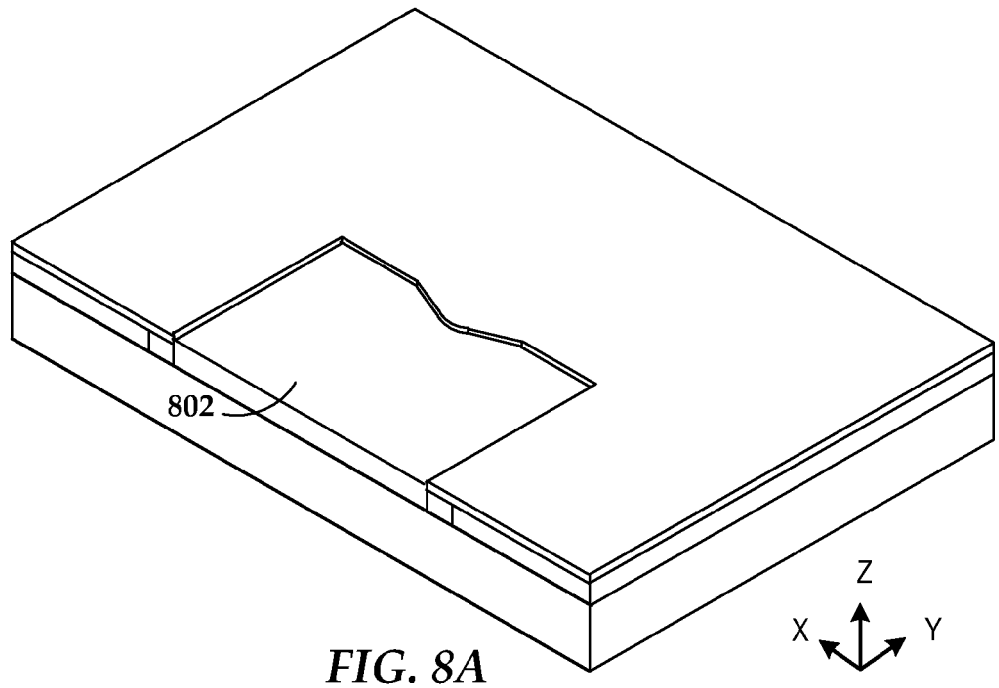
Figure 8B:
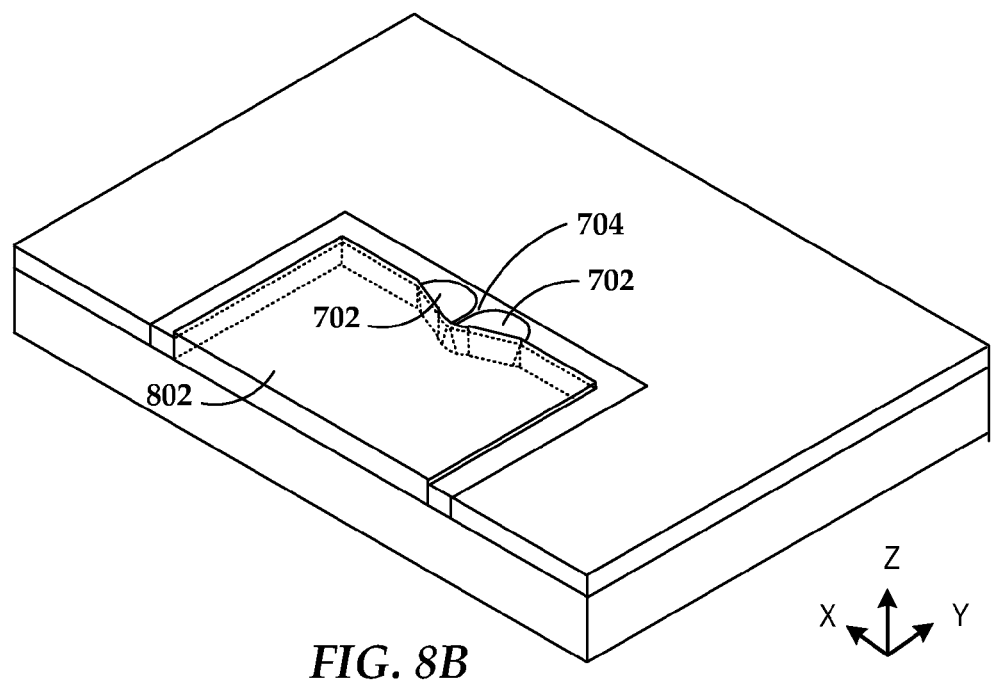

As seen in FIG. 7A, a reactive ion beam etching (RIBE) process has removed material not covered by the hard mask, leaving NFT elements 702 with the desired shape facing the ABS. The angle of the RIBE etch can be adjusted so that a vertical sidewall is achieved. For purposes of this figure, the plasmonic metal is shown with shading, illustrating the $SiO_2$ dielectric gap 704 and surrounding $SiO_2$ dielectric materials 706. At the stage shown in FIG. 7B, regions 712 and 714 are a 200 nm thick layer of $SiO_2$ that has been deposited on the NFT and hardmask 612. As seen in FIG. 8A, extra $SiO_2$ has been removed using CMP to make the $SiO_2$ in region 802 as flat as possible. In FIG. 8B, the aC hardmask has been ashed away, exposing the metal elements 702.

Figure 9A:
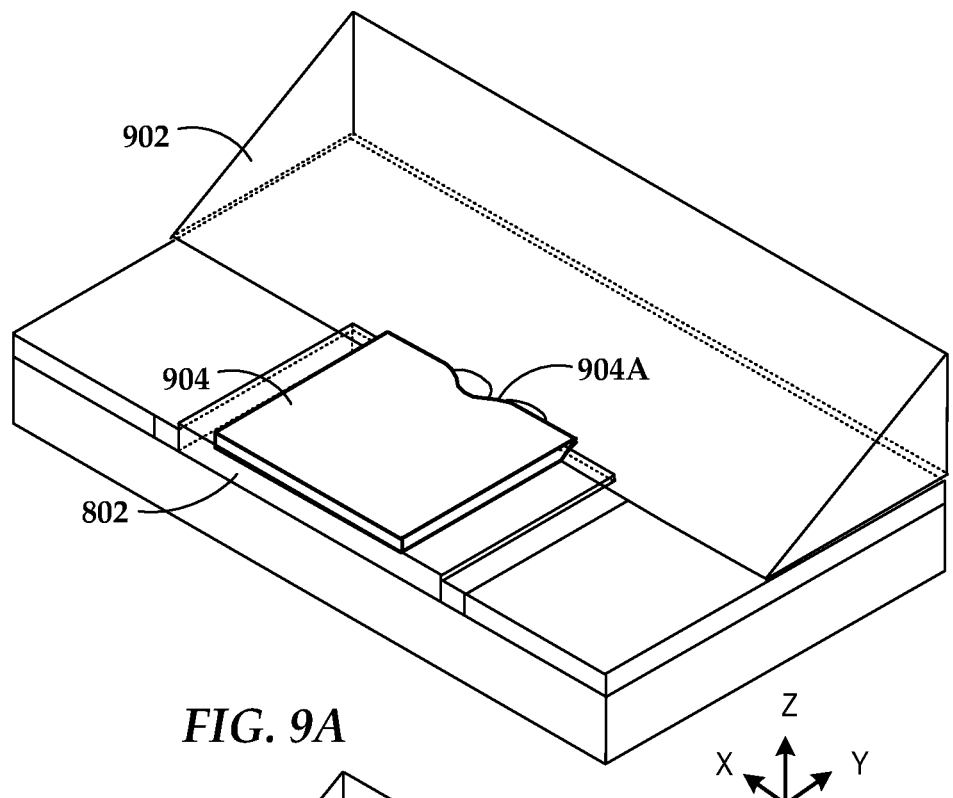
Figure 9B:
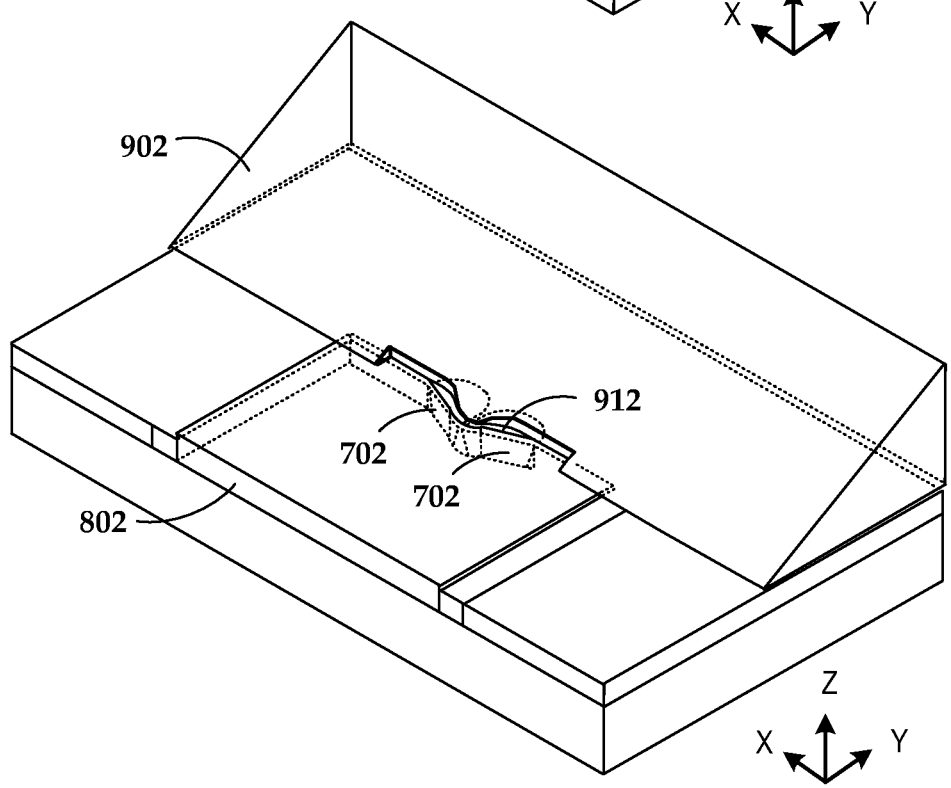
Figure 10:
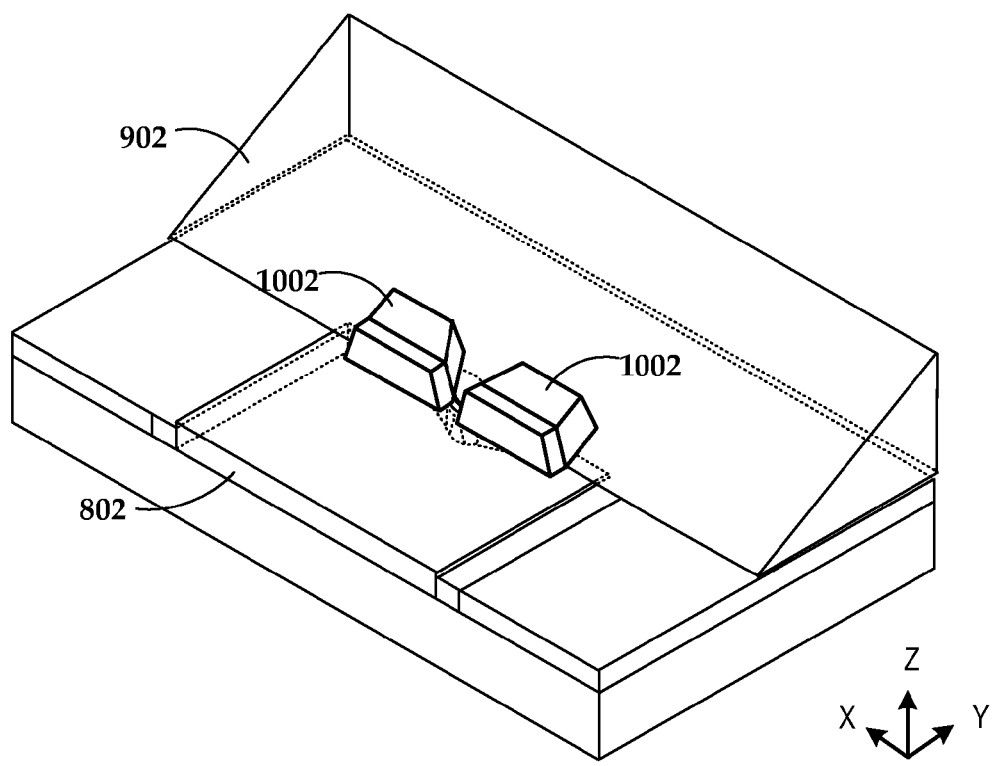

In reference now to FIG. 9A, a 50-80 nm thick aC etch stopper 904 is patterned and carefully positioned over the NFT 702. The aC etch stopper has the same curvature at its top edge as the NFT 702. Top cladding layer 902 is deposited over the aC etch stopper. An aC etch hard mask (not shown) is patterned over the top cladding layer. The edge of the aC hard mask is carefully positioned according to the top cladding thickness so that with a 30 degree static RIBE, the etched sloped wall intersects with the edge of the aC stopper An edge 904A of the etch stopper 904 has a shape conforming to the NFT cutout shape 604 shown in FIG. 6A. In FIG. 9B, the hardmask has been ashed away to expose 50 nm to 100 nm of the NFT portions 702. Note that due to the shape of the etch stopper intersecting with the sloped wall 902, a step 912 exists between the NFT portions 702 and the sloped wall 902. As seen in FIG. 10, heat sink portions 1002 may be deposited over this step 912 using a plating or liftoff method.

Figure 11:
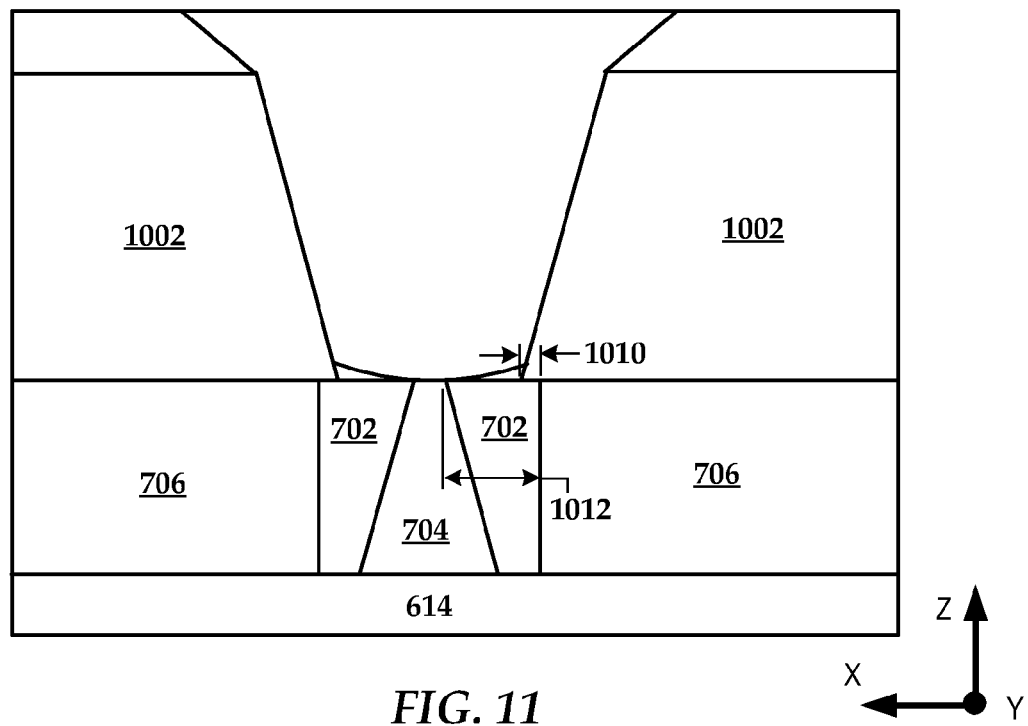
FIG. 11 is a cross-sectional view of a near-field transducer and heat sink according to an example embodiment.

In reference now to FIG. 11, a diagram illustrates a front, cross-section of an example final structure NFT as viewed from the air-bearing surface. The NFT includes metallic elements 702 on a substrate 614, the elements 702 surrounding a dielectric gap 704. Dielectric portions 706 surround the outer surfaces of the elements 702, and heat sinks 1002 touch at least a portion of the NFT elements 702 as indicated by overlap dimension 1010. The heat sinks 1002 only overlap a portion of the NFT elements 702 so as to limit the affecting the plasmonic field generated by the metallic elements. Various values of overlap dimension 1010 and top NFT dimension 1012 are possible. For purposes of this example, dimension 1010 may vary from 10 nm to 40 nm, and the dimension 1012 may vary from 50 nm to 100 nm. The angle of the taper of the NFT elements 702 can be adjusted as needed. Generally, the small cross section of the elements 702 exposed at the air-bearing surface limits protrusion of the elements 702 under high temperature and further limits burnish due to manufacturing operations and/or contact with media during use.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:
1. An apparatus comprising:
   a plasmonic transducer that includes at least two metal elements with a gap therebetween, wherein the gap is disposed along a plasmon-enhanced, near-field radia- tion delivery axis, and wherein the metal elements comprise a taper which results in a reduced cross section portion of the metal elements at a media-facing surface oriented normal to the delivery axis; and a dielectric material surrounding the reduced cross section portion of the plasmonic transducer at the media-facing surface, wherein the dielectric material reduces deformation of the metal elements proximate the media-facing surface at elevated temperatures.

2. The apparatus of claim 1, wherein the dielectric material has a lower thermal expansion coefficient than the metal elements.

3. The apparatus of claim 1, further comprising a waveguide adjacent a portion the plasmonic transducer, wherein the waveguide is optically coupled to the plasmonic transducer along the delivery axis.

4. The apparatus of claim 1, wherein the dielectric material has an opening to expose the metal elements at an output end of the plasmonic transducer.

5. The apparatus of claim 1, wherein each of the metal elements comprise a congruent cross-sectional shape along the delivery axis.

6. The apparatus of claim 1, wherein the gap is filled with the dielectric material.

7. The apparatus of claim 1, wherein the metal elements are co-planar on a substrate-parallel plane.

8. The apparatus of claim 1, wherein the reduced cross section portion of the metal elements has a trapezoidal shape.

9. The apparatus of claim 1, further comprising a heat sink disposed in contact with the metal elements.

10. The apparatus of claim 9, wherein the heat sink comprises at least two heat sinks contacting the at least two metal elements at a portion of the metal elements away from the gap.

11. An apparatus comprising:

a plasmonic transducer that includes at least two metal elements with a gap therebetween, wherein the gap is disposed along a plasmon-enhanced, near-field radiation delivery axis, and wherein the metal elements comprise a taper which results in a reduced cross section portion of the metal elements at a media-facing surface oriented normal to the delivery axis; and a dielectric material surrounding the reduced cross section portion of the plasmonic transducer at the media-facing surface, wherein the dielectric material reduces protrusion of the metal elements proximate the media-facing surface at elevated temperatures, the dielectric material having a lower thermal expansion coefficient than the metal elements.

12. The apparatus of claim 11, further comprising a waveguide adjacent a portion the plasmonic transducer, wherein the waveguide is optically coupled to the plasmonic transducer along the delivery axis.

13. The apparatus of claim 11, wherein the dielectric has a small opening to expose the metal elements at an output end of the plasmonic transducer.

14. The apparatus of claim 11, wherein each of the metal elements comprise congruent cross-sectional shape along the delivery axis.

15. The apparatus of claim 11, wherein the gap is filled with the dielectric material.

16. The apparatus of claim 11, wherein the metal elements are co-planar on a substrate-parallel plane.

17. The apparatus of claim 11, wherein the reduced cross section portion of the metal elements has a triangular shape.

18. The apparatus of claim 11, further comprising a heat sink disposed in contact with the metal elements.

19. The apparatus of claim 18, wherein the heat sink comprises at least two heat sinks contacting the at least two metal elements at a portion of the metal elements away from the gap.

20. The apparatus of claim 11, wherein the apparatus comprises a heat-assisted media recording device.

* * * * *